E. R. STASCH.
CONDUCTOR STRAINER.
APPLICATION FILED MAR. 2, 1908.

906,956.

Patented Dec. 15, 1908.

WITNESSES:

INVENTOR
Emil R. Stasch
by E. B. Stocking
Attorney

THE NORRIS PETERS CO., WASHINGTON, D. C.

UNITED STATES PATENT OFFICE.

EMIL R. STASCH, OF CORNING, NEW YORK.

CONDUCTOR-STRAINER.

No. 906,956.　　　Specification of Letters Patent.　　　Patented Dec. 15, 1908.

Application filed March 2, 1908. Serial No. 418,784.

*To all whom it may concern:*

Be it known that I, EMIL R. STASCH, a citizen of the United States, residing at Corning, county of Steuben, and State of New York, have invented certain new and useful Improvements in Conductor-Strainers, of which the following is a specification, reference being had therein to the accompanying drawing.

This invention relates to a conductor strainer, and particularly to a removable structure adapted for application to the inlet of a conducting pipe to prevent foreign substances entering and clogging the pipe.

The invention has for an object to provide a novel and improved construction of strainer comprising a series of parallel rods provided at each end with projections by which the rods are held above the bottom of the trough in which they are placed, said rods being connected by cross wires and supported against longitudinal displacement by extending arms entering the inlet of the conducting pipe.

Other and further objects and advantages of the invention will be hereinafter fully set forth and the novel features thereof defined by the appended claims.

Figure 1:
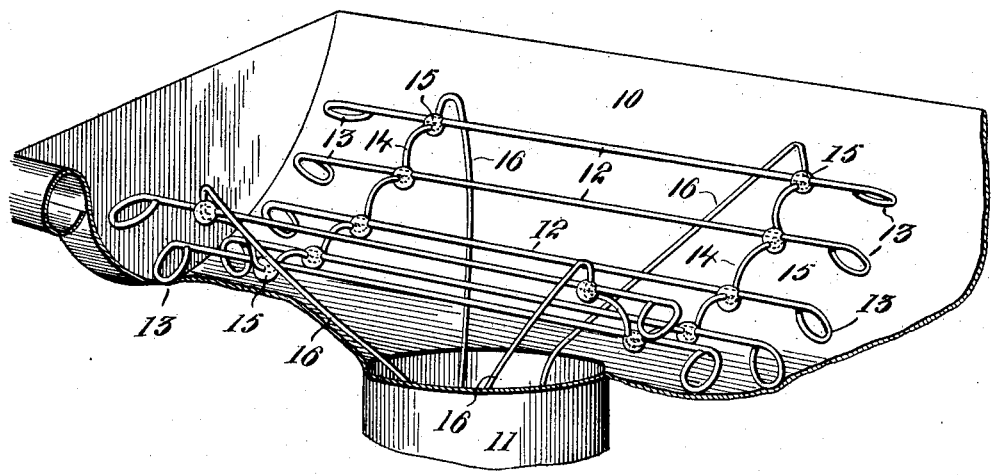
Figure 2:
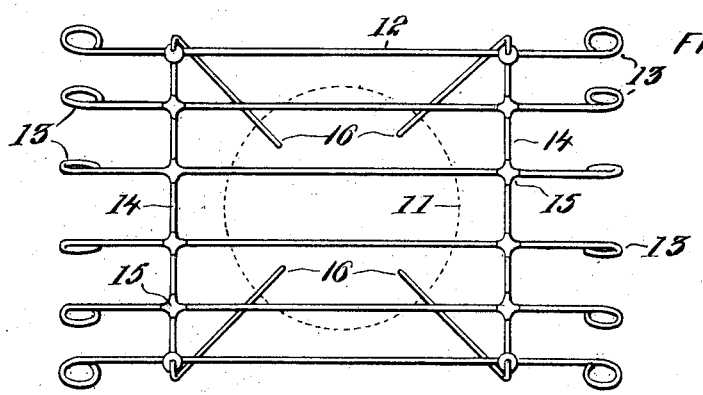
Figure 3:
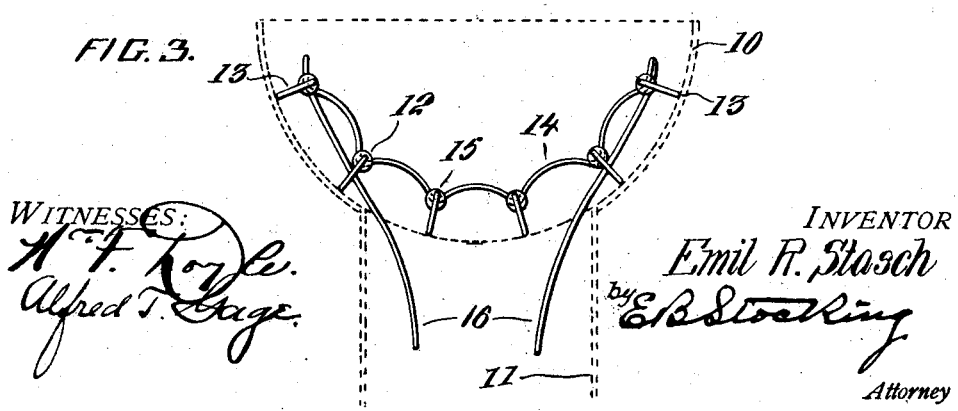

In the drawing:—Figure 1 is a perspective with parts in section showing the application of the invention; Fig. 2 is a plan thereof, and Fig. 3 is an end view showing the eaves trough and pipe in dotted lines.

Like numerals refer to like parts in the several views of the drawing.

The strainer is adapted for application in any desired position, but is here shown in connection with the eaves trough 10 from which the conducting pipe 11 leads to any desired point of discharge. The strainer comprises a series of parallel rods or bars 12 provided at each end with laterally extending projections 13 by which the bars are supported from the body of the trough. These projections may be of any desired shape, preferably curved into circular form, as shown, and are disposed at an angle to each other relative to the curvature of the trough or receptacle in which they are disposed. The rods 12 may be connected in any desired manner, one form of which comprises the cross rods 14 which are arched upward intermediate the rods 12 and passed beneath said rods to which they are secured in any preferred manner, for instance, by means of the soldered joint 15. The free ends 16 of these cross rods are bent back toward the midlength of the rods 12 and toward each other thus forming a series of arms adapted to enter the inlet end of the conducting pipe 11 and hold the strainer against longitudinal displacement relative to the pipe.

In the application of the invention it will be seen that the parallel rods are disposed sufficiently close together to prevent the entrance of leaves or other obstructions which might clog the conducting pipe, and by the lateral projections at the ends of the rods they are supported above the bottom of the trough to permit the free flow of water beneath any foreign matter which may rest upon the strainer. The mounting of the strainer permits its ready removal for cleaning and also prevents any lateral displacement thereof due to the material being carried against it in the flow of water during a sudden or heavy fall of rain. The invention therefore presents a simple, economically constructed and very efficient strainer in which the cross bars connecting the longitudinal bars provide means for mounting and holding the strainer in position.

Having described my invention and set forth its merits, what I claim and desire to secure by Letters Patent is:—

1. A strainer comprising a series of substantially straight rods provided with lateral supporting projections at each end, and cross bars connecting said rods.

2. A strainer comprising a series of parallel rods provided with lateral supporting projections at each end, and cross bars connecting said rods and having free arms directed toward each other and extended beneath said parallel rods.

3. A strainer comprising a series of parallel rods having their opposite ends curved to form supporting projections, cross bars connecting said parallel rods at each side of the center thereof, and retaining arms extended from said cross bars toward the center of the strainer structure and laterally therefrom.

4. A strainer comprising a concave structure composed of a series of parallel rods having curved supporting portions at opposite ends, connecting rods arched intermediate of said parallel rods and connected therewith, the free ends of said cross bars being bent inward and downward toward the center of the structure.

5. A strainer comprising a concave structure composed of a series of substantially straight rods having laterally disposed supporting portions at each end, and means extending transversely of the rods for supporting them in spaced relation to each other.

In testimony whereof I affix my signature in presence of two witnesses.

EMIL R. STASCH.

Witnesses:
F. H. FERRIS,
LIGNON GILL.